US008671389B1

(12) United States Patent
Buryak et al.

(10) Patent No.: US 8,671,389 B1
(45) Date of Patent: Mar. 11, 2014

(54) WEB APPLICATION RESOURCE MANAGER ON THE WEB AND LOCALIZABLE COMPONENTS

(75) Inventors: Kirill Buryak, Sunnyvale, CA (US); Jeremy Aron-Dine, San Francisco, CA (US); Luke Hiro Swartz, San Francisco, CA (US)

(73) Assignee: Google Inc., Mountain View, CA (US)

( * ) Notice: Subject to any disclaimer, the term of this patent is extended or adjusted under 35 U.S.C. 154(b) by 157 days.

(21) Appl. No.: 13/246,288

(22) Filed: Sep. 27, 2011

(51) Int. Cl.
*G06F 9/44* (2006.01)

(52) U.S. Cl.
USPC .............................. 717/109; 717/108; 717/120

(58) Field of Classification Search
USPC ......................................... 717/105–116, 120
See application file for complete search history.

(56) References Cited

U.S. PATENT DOCUMENTS

| 6,470,349 | B1 * | 10/2002 | Heninger et al. | 717/115 |
|---|---|---|---|---|
| 6,662,357 | B1 * | 12/2003 | Bowman-Amuah | 717/120 |
| 6,964,014 | B1 * | 11/2005 | Parish | 715/205 |
| 7,290,244 | B2 * | 10/2007 | Peck et al. | 717/109 |
| 7,313,587 | B1 * | 12/2007 | Dharmarajan | 709/201 |
| 7,451,432 | B2 * | 11/2008 | Shukla et al. | 717/106 |
| 7,454,743 | B2 * | 11/2008 | Fuchs | 717/108 |
| 7,512,932 | B2 * | 3/2009 | Davidov et al. | 717/106 |
| 7,784,026 | B1 * | 8/2010 | Wong | 717/109 |
| 7,996,814 | B1 * | 8/2011 | Qureshi et al. | 717/120 |
| 8,086,995 | B2 * | 12/2011 | Luo et al. | 717/105 |
| 8,219,974 | B2 * | 7/2012 | Schmidt | 717/120 |
| 8,341,595 | B2 * | 12/2012 | Arner et al. | 717/109 |
| 8,375,354 | B2 * | 2/2013 | Shenfield et al. | 717/107 |
| 8,464,213 | B1 * | 6/2013 | Stienstra et al. | 717/107 |
| 2002/0133570 | A1 | 9/2002 | Michel | |

FOREIGN PATENT DOCUMENTS

GB 2478016 2/2010

OTHER PUBLICATIONS

Obrenović et al, "Web Browser Accessibility using Open Source Software", ACM, pp. 15-24, 2007.*
Abou-Zahra et al, "Essential Components of Mobile Web Accessibility", ACM, pp. 1-4, 2013.*
Lerner et al, "Supporting Dynamic, Third-Party Code Customizations in JavaScript Using Aspects", ACM, pp. 361-376, 2010.*
Henricksen et al, "Adapting the Web Interface: An Adaptive Web Browser", IEEE, pp. 21-28, 2001.*
Husmann, Yvonne , "Localization of web user interfaces. Cross-cultural differences in home page design.", Wissenschaftliche Arbeit zur Erlangung des Diplomgrades im Studiengang Sprachen-, Wirtschafts-und Kulturraumstudien (Diplom-Kulturwirt), 2001.
Oracle, ,"Oracle Java Wireless Client: Architecture and Design Guide", Oracle, Release 3.0 E18961-01, May 2011.
Sandrini, Peter ,"Localization and Translation", LSP Translation Scenarios. Selected Contributions of the EU Marie Curie Conference Vienna, 2007.

* cited by examiner

*Primary Examiner* — Anil Khatri
(74) *Attorney, Agent, or Firm* — Morris & Kamlay LLP

(57) ABSTRACT

Applications can be localized by a localization expert to allow them to be used by a broader customer base. The localization can be conducted by a localization expert who is provided with a resource file containing localizable components. The resource file can be generated by providing a developer with one or more text strings based on the development code of the application and receiving the localizable components which are selected from with the text strings based on the development code.

17 Claims, 6 Drawing Sheets

WEB APPLICATION RESOURCE MANAGER ON THE WEB AND LOCALIZABLE COMPONENTS

BACKGROUND

A localization expert can modify a parent application (application) coded in a coding language (e.g., HyperText Markup Language, JavaScript™, C++, Drupal™, etc.) for numerous reasons, such as to make the application more useful for a larger audience, to make the application more applicable to a different culture, to account for differences in distinct markets, etc. The application may be modified by modifying a resource such as a text string, color and style settings, image and style icon files, sound files, etc. For example, software originally designed for the United States market may generate an error message containing a text string in English if a user clicks a specific button within the software. A localization expert may localize the error message such that a Chinese-speaking user in the Chinese market may be able to understand the localized error message in a similar way that an English-speaking user in the United States market understands the original message. Accordingly, the same or similar software can be used by a larger number of users.

A localization expert may not have access to a live instance of the application or may not be able to edit the application directly. Access to a live instance of an application may not be efficient as the application may be a secured application, may be a large application such that the localization expert may not know which aspects to localize, the developer may only require a portion of the application to be localized, etc. For example, a large software program may contain fifty different user graphical user interfaces, each corresponding to a different aspect of the program. A localization expert given the software program in its entirety may not be able to find all the localizable aspects within all the graphical user interfaces. Accordingly, the localization process would not be efficient.

BRIEF SUMMARY

According to an embodiment of the disclosed subject matter, a method and system for obtaining a code file corresponding to a parent application that modifies features of an original web browser and is programmed in a coding language is described. A code interface comprising a plurality of potential localizable components corresponding to the code file can be rendered. At least one selected localizable component from the plurality of potential localizable components can be received and an original resource file based on the received at least one selected localizable component can be generated. An original code element can be modified to point to a non-native location and a modified resource file based on at least one localization edit by a localization expert can be received. A modified version of the parent application based upon the modified resource file can be generated.

According to an embodiment of the disclosed subject matter, a method and system for obtaining a code file corresponding to a parent application programmed in a coding language is described. A code interface corresponding to the code file can be rendered to a developer, where the code interface comprises a plurality of potential localizable components. At least one selected localizable component from the plurality of potential localizable components can be received and an original resource file based on the received at least one selected localizable component can be generated.

Additional features, advantages, and embodiments of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
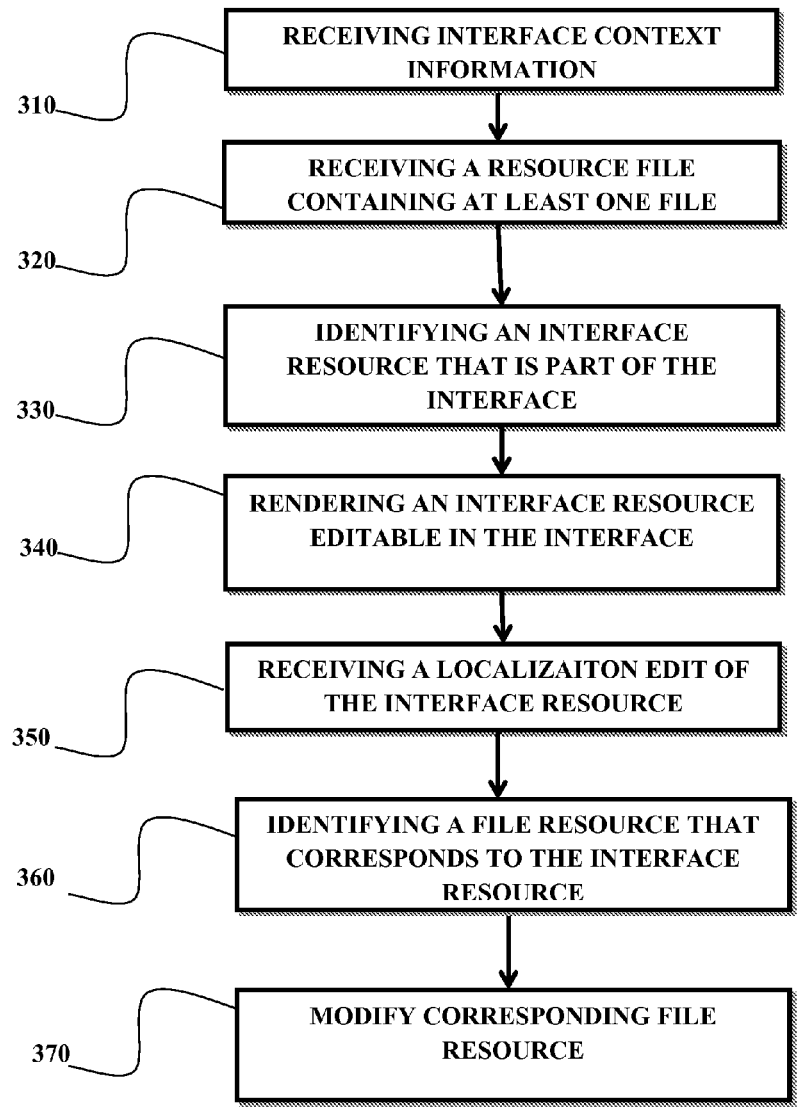
FIG. 1 shows a diagram explaining the in-context localization of an application according to an embodiment of the disclosed subject matter.

As shown in FIG. 1, according to embodiments of the disclosed subject matter, context information about an interface of an application can be provided to a localization expert. Context information about an interface can include text data, image data, audio data, video data, color and style settings, HTML, XML, a CSS data, layout information, executable or interpreted code, etc., and any other information relating to the content, layout and behavior of all or part of a user interface. The context information may be received by the implementation 310. The context information may be based on one or more of a variety of applications, including but not limited to, web based applications, mobile applications, desktop applications, a snapshot of an application, etc., any other applicable application or a combination thereof. The context information may be used to render a localization interface using, at least in part, HyperText Markup Language, Extensible Markup Language, etc., and other information useful in displaying information and may contain interface resources that may be editable within the interface 340. Further, the localization interface may be rendered based at least in part on a resource file 320 containing file resources that are associated with localizable aspects of the application. The file resources 330 may contain a list of pairs that identify the resource and the content of the resource. The format of the file resources may vary based on the application, localization expert, developer, etc. The format may be based on, but not limited to, Java™ properties files, a JSON format, GWT/UI Binder (Java™ properties including comments for resources), an XML format, etc., or a combination thereof. For example, a Java™ properties resource file can contain:
  project.message.okay=Press okay to continue
  project.message.user=User %s logged out
  project.error.noData=Found only %d data points!
A GWT/UI Binder formatted resource file can contain:
  # Shown to user in registration form.
  project.message.okay=Press okay to continue
  # Shown to user on log out event. Placeholder %s shows user
  name.
  project.message.user=User %s logged out
An XML format resource file can contain:

```
<message>
    <id>project.message.user</id>
    <text>User %s logged out</text>
    <comment>Shown to user on log out event.</comment>
    <placeholders>
        <placeholder>
            <text>%s</text>
            <example>John</example>
            <comment>Placeholder %s shows user
            name.</comment>
        </placeholder>
    </placeholders>
</message>
```

Context information that can be used to render a localization interface may be based on a web-based application and can be at least partly generated by activating a browser plugin. The plugin may extract context information from the application and may further extract such information based upon multiple application interface instances (e.g., screen shots) to determine any changes from one or more interface instances to another. Based on the application interface or changes across interface instances, the plugin may obtain application interface resources. These interface resources may be aspects of the interface that can be made editable by the localization expert in a localization interface and may directly correspond to file resources of the application. The interface resources may be obtained by sending a request for a Domain Object Model tree (DOM tree) and Cascading Style Sheet data (CSS) to an application (such as a stand-alone program, an online service, etc.) and detecting interface resources based on the request. For example, Web based applications, the user can install and use a browser plug-in that detects when the page that user is viewing has changed. This can be done by listening to the public notifications and/or detecting the events of all or part of the structure of the page can be obtained when the plug-in requests, from the browser, a current DOM tree of the page elements and their CSS styling. This can contain exactly the interface elements (resources) present (e.g., visible, present but not displayed, etc.) at the moment, including those that may be dynamically created by JavaScript™, loaded resources and elements based on retrieved data requests. The plug-in can send all or part of the data to a server for final assembly. The data can include not only HTML and CSS code, but also other resources, such as images and backgrounds used in the page. On the server side, non-interface elements of the DOM tree can be removed and CSS styles can be added as one of the nodes of the DOM tree. The result may be transformed into HTML text or any other suitable form.

Context information based on a mobile application may be generated by extracting embedded text from within the mobile application. The mobile application may be an application for any mobile technology including mobile phones (e.g., QWERTY based phones, touchscreen phones, flip based phones, slide based phones, operating systems loaded phones, etc.), tablets (e.g., capable of processing audio-visual data including books, periodicals, movies, music, games, and web content which may be QWERTY based, touch screen based, flip based, etc.) or any other applicable mobile technology. The extraction may be conducted through Optical Character Recognition (OCR) techniques, by reading text in HTML, etc. The implementation may extract location data corresponding to interface resources (e.g., locations at which photographs or videos were taken, stored locations of the mobile platform at the time of a phone call or text message (sent or received), etc. The location data can be used to allow the localization expert to localize elements of the application by allowing a localization expert to visually see the location of the interface resource.

Some mobile systems allow developers to run their applications on a desktop machine in an emulated mode. These systems grant the emulator program access to basic structure of presented elements for the purpose of rendering. To capture snapshots of mobile applications, the user can connect the mobile device to desktop computer and runs an application in accordance with embodiments of the disclosed subject matter, the application can access the interface elements structure and their basic information and retrieve the position (coordinates in mobile screen) for each displayed element and embedded text (if any). It can also retrieve an image and/or screenshot of a widget as an image file, such as a .jpeg or .png file. The retrieved data can be sent to a server and assembled into an HTML structure. The server can create an HTML file for each snapshot taken. Each file can have a screenshot of the whole application set as a background and can contain HTML tags representing interface elements. For each interface element found in the interface, the application can place a <div> HTML element in an absolute position, according to the coordinates found. The <div> element obtains a screenshot image as a background and text found as content. The resulting HTML page can be transformed into an HTML text snapshot.

A localization interface based on a snapshot may be generated by extracting context information and application interface resources from an application interface snapshot by extracting embedded text or images within the application interface. The extraction may be conducted through an OCR technique, pattern recognition, file extraction or any other applicable extraction techniques. An extraction based on a snapshot may be based upon multiple snapshots of the application. A more recently captured snapshot can be compared to a less recently captured snapshot to determine if there are any differences between the two snapshots. If there are differences, the implementation may detect new interface resources based on those differences. For example, if a new message, alert, window, picture, etc., appears in a second snapshot compared to a first snapshot, the new element can be determined to be an interface resource that may be suitable for localization. For widget detection, sub-parts of the screenshots can be compared with known widget images or rectangular shapes can be detected on the screenshots. Based on the detection result, an HTML snapshot can be created. For example, a new HTML page can be created with a background of the application screenshot. For all detected elements (text, widgets, other resources, etc.) absolutely positioned <div> elements can be placed in the page. The resulting HTML page can be transformed into an HTML text as a final snapshot.

A similar approach can be used for different types of desktop applications that allow programmatic access to the presented interface and/or where an operating system can provide details of presented interfaces. In those cases, a desktop application in accordance with embodiments of the disclosed subject matter can access data of the captured application directly (when possible) or through an emulator. Based on data found, the interface can be recreated as an HTML page, which can be sent to the server.

Interface resources can be aspects of the application interface that can be edited by a localization expert using a localization interface. For example, an application message that includes the word "Welcome!" may be shown in a localization interface in a context similar or identical to the way it appears in the corresponding application interface. The localization interface may (perhaps unlike the application interface) render this message in such a way as to make it editable by the localization expert, e.g., by modifying "Welcome!" to "Bienvenue!" to help localize an English-based application interface to a French language user base. In this manner, the localization expert can visually see the context in which the interface resource is embedded in the interface, and localize the interface resource accordingly. Accordingly, the localization expert can provide a localization edit 350 of the interface resource directly within the provided localization interface. The localization interface can act as a What You See Is What You Get (WYSIWYG) editing facility to localize application interface resources. By preserving the context information of the application interface in the localization interface, the localization expert can better determine the appropriate localization edits to accurately convey the best meaning possible to the user in the localized environment.

According to embodiments of the disclosed subject matter, the implementation may receive the resource file associated with an application, which contains file resources. The resource file containing the file resources can be associated with the application such that the resource file is used when compiling the application and determines, at least in part, what elements are included in the application interface. The application based on the resource file can contain aspects that may be localizable. File resources within the resource file may be associated with the aspects of the application that may be localizable. In some embodiments, each file resource may correspond to a localizable aspect in the application interface. Accordingly, editing a file resource within the resource file can subsequently alter an application when the application is later compiled using the edited (localized) resource file.

A localization file resource can be a file containing localization interface resources and/or references thereto. The localization file resource can be based upon an application file resource provided by, for example, the developer of the application; information extracted from output of one or more instances of the application itself, such as from HTML code generated by the application; or resources extracted from one or more screenshots of the application interfaces.

Figure 4:
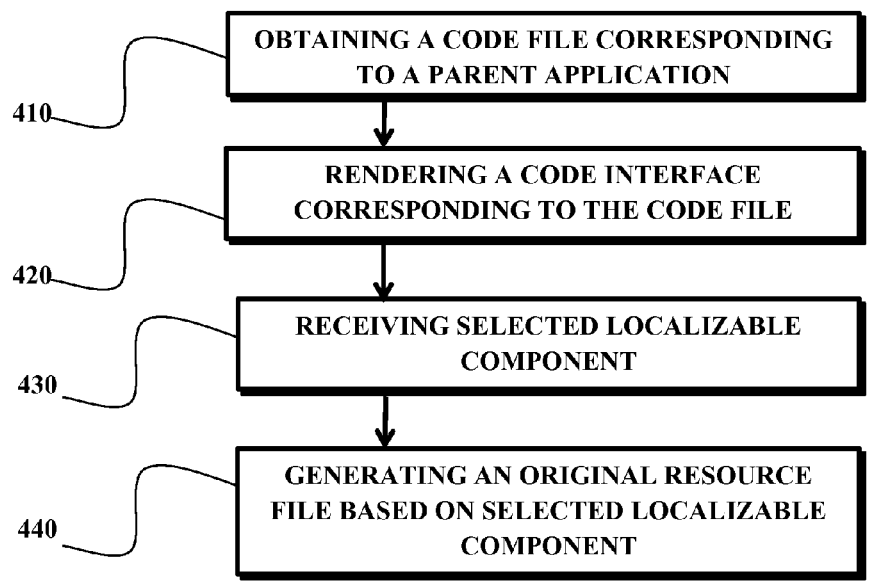
FIG. 4 shows a diagram explaining the extraction of localizable text strings according to an embodiment of the disclosed subject matter.
Figure 5:
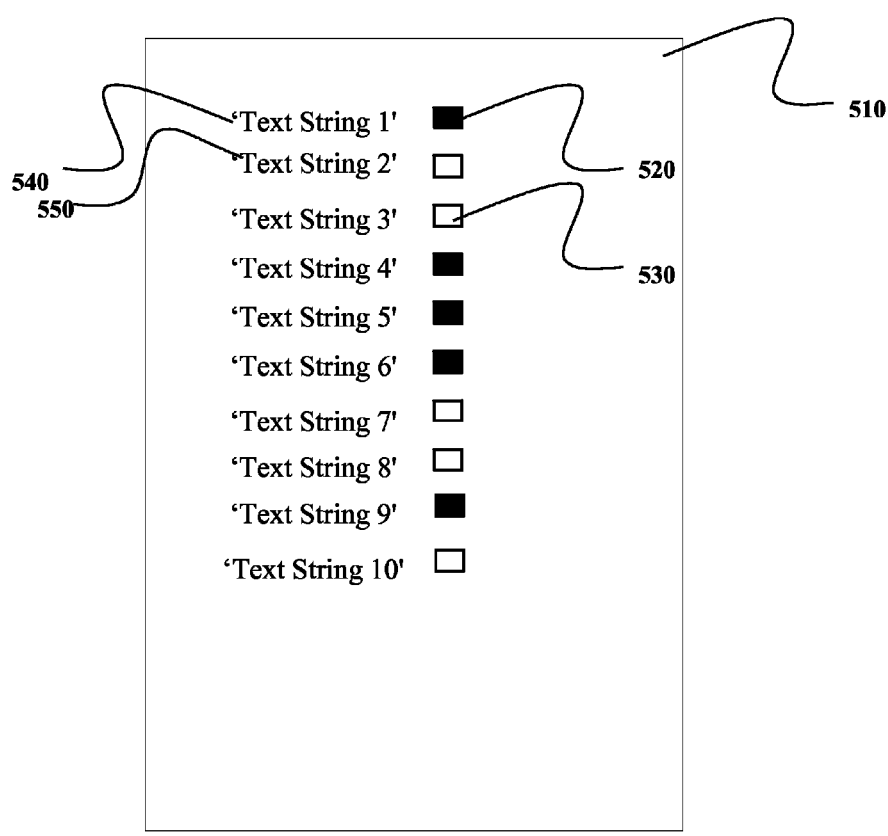
FIG. 5 shows a code interface according to an embodiment of the disclosed subject matter.

According to an embodiment of the disclosed subject matter, a resource file to be provided to the localization expert can be created by extracting aspects of the application. As shown in FIG. 4 and FIG. 5, the implementation may receive a code file 410 which corresponds to an application. The code file can contain development code for the application and may be in a compressed format such as, but not limited to, .zip, .rar, .cab, .dmg, etc. or a combination thereof. The contents of the code file can be rendered to a developer at 420, such as by way of a code interface 510. The code interface can be an interactive electronically-generated interface such that the developer can select components from within the code file via the code interface. For example, a code interface can be a computer processor connected to a screen (e.g., computer monitor, television, tablet, etc.) used to display an application which allows the developer to see the components of the code file on the monitor.

For example, as shown in FIG. 5, all of the text strings contained within the code file may be rendered and presented to the developer. The text strings can include components of the application which are visible to a user when using the parent application and/or components of the code of the application not visible to a user when using the parent application. For example, part of the following HTML code corresponds to code is visible to a user, and part corresponds to code not visible to a user.

<!-Introduce program to the world.-->
<p> Hello World! </p>

The comment ("Introduce program to the world.") is code that is not visible to a user, whereas the text within the paragraph tags ("Hello World!") is code corresponding to what the user views. Accordingly, the developer may be rendered both the comment and the text within the paragraph tags via code interface. For illustrative purposes, the comment may correspond to 'Text string 1' 540 and the text within the paragraph tags may correspond to 'Text string 2' 550.

A developer may select one or more of the text strings at 430, such as by using a user interface component 520 as shown. The selection may be carried out in any manner that distinguishes the selected text strings from the unselected strings. The selection may be carried out by, for example, selecting a check box corresponding to a text string, selecting a radio button corresponding to a text string, highlighting a text string, circling a text string, reformatting a text string, etc. or a combination thereof. The selected text string or strings may be based on the text strings corresponding to components of the application visible to a user. For example, as shown in FIG. 5, the text string "Hello World!" and/or other code or text corresponding to visible text to a user may be selected 520, whereas a comment invisible to a user may not be selected 530. Further, the selected text strings can be the localizable components which can be sent to a localization expert.

Figure 6:
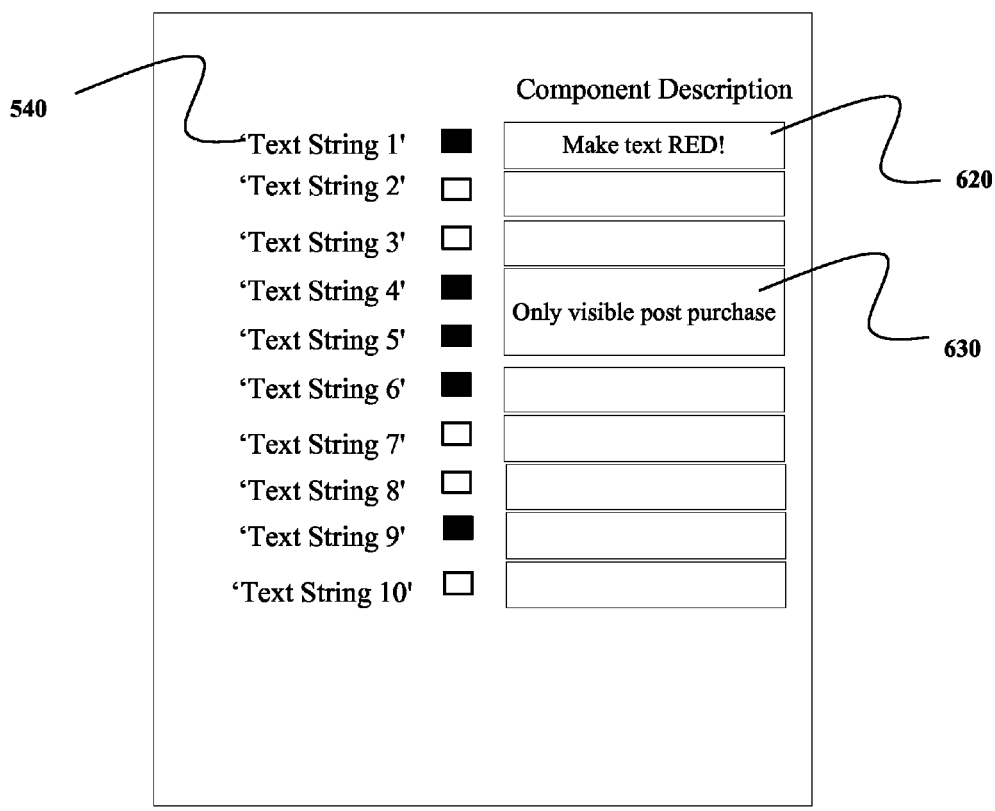
FIG. 6 shows a code interface with a component description field according to an embodiment of the disclosed subject matter.

As shown in FIG. 6, a code interface may contain an area designated to receive component descriptions corresponding to a specific text string 620 or to a group of text strings 630. A component description can be instructions to a localization expert regarding a corresponding localizable component. Alternatively, a component description can be context information regarding a corresponding localizable component. The context information may be information regarding the aesthetics related to the localizable component or may be information regarding the use of the localizable component in the parent application. For example, the component description may be "Only visible post purchase," 630 indicating to the localization expert that the text string which is to be localized is only visible to a user after the purchase of an item. This information may allow the localization expert to tailor the localization such that, for example, the tone of the localized text string is thankful instead of persuasive. Alternatively, the component description may be "Make text RED!" 620 which indicates to the localization expert that the localized text should be formatted such that the text is displayed in red.

An original resource file can be created 440 based on the selected localizable components and may contain the selected localizable components or context information regarding the selected localizable components. File resources within the resource file may correspond to individual or grouped selected text strings. For example, corresponding to FIG. 5 and FIG. 6, an original resource file can contain five different file resources, one file resource for each of the selected (darkened check box) text strings. The original resource file may be provided to a localization expert According to embodiments of the disclosed subject matter, a localization file resource corresponding to a localization interface resource may be identified 360 after receiving an original resource file from the developer. The identification may occur before or after rendering a localization interface to a localization expert. This correspondence can be used to relate a localization interface onscreen edit to a resource in the localization resource file. Thus, a change to the onscreen resource can be reflected in a change to the corresponding resource in the localization resource file, 370.

The localization file resource that corresponds to the resource modified onscreen by the localization expert can be identified by comparing the localization resource being modified to resources in the localization file. A match can be made based upon similarity. Once the corresponding localization file resource is identified, it can be modified in accordance with the change made onscreen by the localization expert. The modified localization resource file can later be used directly or be used to generate an application resource file that can be compiled or included by the developer with the rest of the application. The result can be a localized application in which the application resources have been modified by the localization expert.

According to some embodiments of the disclosed subject matter, the implementation may identify a localization file resource corresponding to an interface resource by converting the file resource to a regular expression and comparing the regular expression to the interface resource. For example the file resource may be:

"The user %s has %d messages."
A regular expression of the file resource can be:
"The user [^< >]* has [0-9]+ messages."

According to some embodiments of the disclosed subject matter, a user can be provided with an interface that permits the user to manually match a localization interface resource to the appropriate file resource. For example, the user may be provided with a list of the resources in a localization resource file and given the opportunity to match an onscreen resource to one or more resources in the list.

According to some embodiments of the disclosed subject matter, file resources corresponding to an interface resource may be identified by individually labeling the file resources to create specially augmented default file resources. Labeling the file resources may distinguish a file resource from other file resources within the resource file. The labels may be inserted both in the beginning and the end of a file resource and can accordingly mark the beginning and end of the resource. For example, a file resource may originally be:

"User %s is done"
An augmented version of the file resource can be:
"{U+1234} User % is done {U+1235}."

A corresponding interface and interface resources may be generated based on the augmented default file resources and rendered to a localization expert. The labels may include non-rendered characters that may be detectable by a machine, but not appear to a user in the localization interface. If the localization expert provides a localization edit through the localization interface, the corresponding resource in the localization file resource can be identified based upon comparing the labels around the onscreen resource being edited and the labels around resources in the localization resource file. The corresponding localization file resource may be modified based on the localization edit, and subsequently a localized application may be compiled based upon the modified localization resource file. By matching the localization edit within the localization interface with the correspondingly labeled resource element in the localization resource file, the implementation can reduce or eliminate improper localizations caused by mismatches. As an illustrative example, as shown in Table 1, the term "Enter" which represents asking a user to press the enter key corresponds to the third file resource within the localization resource file. Without any labeling, the second and third file resources may not be differentiable. However, after labeling the resources, each resource is distinguished by the labels assigned to the beginning and end of the resource. Thereafter, the generated interface resources can contain a matching label as shown in Table 1. The interface resource can therefore be matched to the corresponding augmented default file resource.

TABLE 1

| Resource file location | Context | File Resource | Augmented Default File Resource (DAFR) | Interface Resource based on DAFR |
|---|---|---|---|---|
| 1 | Exit page | Exit | {U + 1000} Exit {U + 1001} | {U + 1000} Exit {U + 1001} |
| 2 | Enter page | Enter | {U + 2000} Enter {U + 2001} | {U + 2000} Enter {U + 2001} |
| 3 | Press Enter key | Enter | {U + 3000} Enter {U + 3001} | {U + 3000} Enter {U + 3001} |
| 4 | Agree to terms | Agree | {U + 4000} Agree {U + 4001} | {U + 4000} Agree {U + 4001} |

A localization of the phrase "Enter" in the application that asks the user to press the Enter Key would be matched only with the corresponding localization resource file resource. Accordingly, a localized version of the phrase "Enter" can be matched with the proper augmented default file resource and the use of that file resource to compile the application can result in a properly localized application.

A localization interface built with captured context information can be made editable in accordance with embodiments of the disclosed subject matter. For example, resources in a snapshot HTML code version of an application interface can be marked with HTML tags containing custom attributes with data describing the resource. When the snapshot is loaded in the application, those marking tags in the snapshot are identified and can be assigned events that will display a localization interface that makes the resource editable by the localization expert. For example, consider two resources:
    test.message.1="Logout"
    test.message.2="Hello %s!"
The original snapshot HTML text contains:
. . . <div>Hello John! <span>Logout</span></div> . . .
The snapshot HTML with markings can be:
. . . <div>
    <span msg="test.message.1">Hello John!</span>
    <span><span msg="test.message.2">Logout</span></span>
</div> . . .
Code can be added:

---

```
// Load the snapshot to an iframe element
iframe.url = 'http://my.server.com/snapshot?id=1234'
// after loading find all marked elements:
var snapshotHtml = iframe.getHtmlNode( );
var allSpanElements =
```

```
    snapshotHtml.getElementsByTagName('span');
for (var span : allSpanElements) {
    // look for span elements with a 'msg' attribute
    if (span.hasAttribute('msg')) {
        // add event happening when user clicks on the message
        span.onClick(function(e) {
            var messageId = e.target.getAttribute('msg');
            // retrieve data of the message from backend
            var messageData =
                BackendService.getDataForMessage(messageId);
            // Show the pre-existing UI
            // element with details of the message
            TranslationUIElement.getInstance( )
                .show(messageDetails);
        });
    }
}
```

According to embodiments of the disclosed subject matter, the localized version of the application may be localized based only on text strings that are selected by the developer. The non-selected text strings may remain constant in the development code, as found in the original application.

According to some embodiments of the disclosed subject matter, the development code for the application may be modified to generate a localized version of the application. The modification may alter the code to point to a non-native location such as the modified resource file. For example, program code language which originally contained a static text string "Please enter your full name:" may be modified such that in place of the static text string, a pointer to a modified resource file is inserted. The pointer can request localized text directly from the modified resource file. For example, if the original development code for an application stated:
document.write("Please enter your full name:");
the code may be modified to point to a localization resource file:
document.write(extension,.i18n.getMessage.("file resource1"));
The 'extension.i18n.getMessage("file resource1"));' corresponds to the location of file resource1 within a resource file. Accordingly, the program code need not be modified separately for each different localization. The pointers to the resource file allow for the same program code to be applied to multiple localization resource files, resulting in multiple localized applications.

Figure 2:
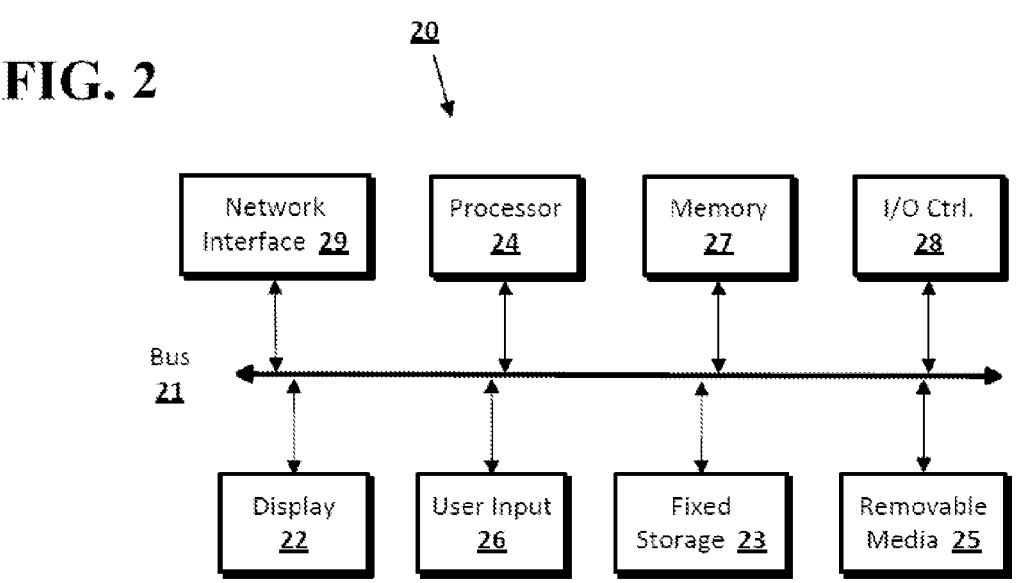
FIG. 2 shows a computer according to an embodiment of the disclosed subject matter.

Embodiments of the presently disclosed subject matter may be implemented in and used with a variety of component and network architectures. FIG. 2 is an example computer 20 suitable for implementing embodiments of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including a digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 3.

Many other devices or components (not shown) may be connected in a similar manner (e.g., document scanners, digital cameras and so on). Conversely, all of the components shown in FIG. 2 need not be present to practice the present disclosure. The components can be interconnected in different ways from that shown. The operation of a computer such as that shown in FIG. 2 is readily known in the art and is not discussed in detail in this application. Code to implement the present disclosure can be stored in computer-readable storage media such as one or more of the memory 27, fixed storage 23, removable media 25, or on a remote storage location.

Figure 3:
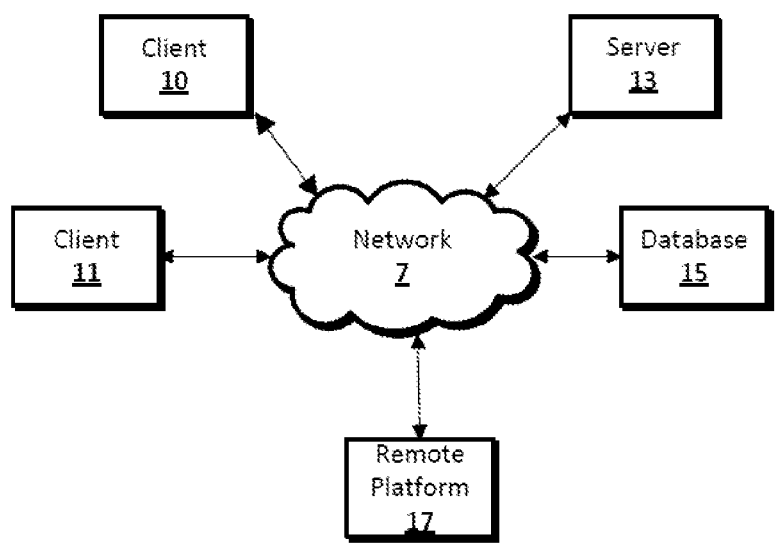
FIG. 3 shows a network configuration according to an embodiment of the disclosed subject matter.

FIG. 3 shows an example network arrangement according to an embodiment of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description and following appendices, for purpose of explanation, have been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method comprising:
    obtaining a code file corresponding to a parent application wherein the parent application modifies features of an original web browser;
    rendering a code interface corresponding to the code file, wherein the code interface comprises a plurality of localizable components selectable for localization via the code interface;
    receiving at least one selected localizable component from the plurality of localizable components;
    receiving a component description corresponding to a selectable localizable component;
    generating an original resource file based on the received at least one selected localizable component;
    modifying an original code element to point to a non-native location;
    receiving a modified resource file based on at least one localization edit by a localization expert; and
    generating a modified version of the parent application based upon the modified resource file.

2. A method comprising:
    obtaining a code file corresponding to a parent application programmed in a coding language;
    rendering a code interface corresponding to the code file, wherein the code interface comprises a plurality of localizable components selectable for localization via the code interface;
    receiving a component description corresponding to a selectable localizable component;
    receiving at least one selected localizable component from the plurality of localizable components; and
    generating an original resource file based on the received at least one selected localizable component.

3. The method of claim 2, further comprising:
    modifying an original code element to point to a non-native location; and
    receiving a modified resource file based on at least one localization edit.

4. The method of claim 3, wherein non-native location corresponds to a location in the modified resource file.

5. The method of claim 2, wherein the parent application is a browser extension.

6. The method of claim 2, wherein the parent application is a web application.

7. The method of claim 2, wherein the original resource file is further based on the component description corresponding to a selected localizable component.

8. The method of claim 2, wherein the code file is in a compressed format.

9. The method of claim 2, wherein the selected localizable components correspond to aspects of the parent application visible to a user.

10. The method of claim 2, wherein the coding language is a JavaScript™ based language.

11. The method of claim 2, wherein the coding language is a HyperText Markup Language (HTML) based language.

12. The method of claim 2, wherein the original resource file is stored in a JSON file.

13. A system comprising:
    a database storing a code file corresponding to a parent application programmed in a coding language;
    a processor in connection with said database, said processor configured to:
    render a code interface corresponding to the code file to a developer, wherein the code interface comprises a plurality of localizable components selectable for localization via the code interface;
    receiving a component description corresponding to a selectable localizable component;
    receive at least one selected localizable component from the plurality of localizable components; and
    generate an original resource file based on the received at least one selected localizable component.

14. The system of claim 13, further configured to:
    modify an original code element to point to a non-native location; and
    receive a modified resource file based on at least one localization edit by a localization expert.

15. The system of claim 14, further configured to generate a modified version of the parent application based upon the modified resource file.

16. The system of claim 13, wherein the original resource file is further based on the component description corresponding to a selected localizable component.

17. A method comprising:
    obtaining a code file corresponding to a parent application programmed in a coding language, wherein the parent application modifies at least one feature of an original web browser;
    rendering a code interface corresponding to the code file, wherein the code interface comprises a plurality of localizable components selectable for localization via the code interface;
    receiving at least one selected localizable component from the plurality of localizable components; and
    generating an original resource file based on the received at least one selected localizable component.

* * * * *